United States Patent Office 3,171,431
Patented Mar. 2, 1965

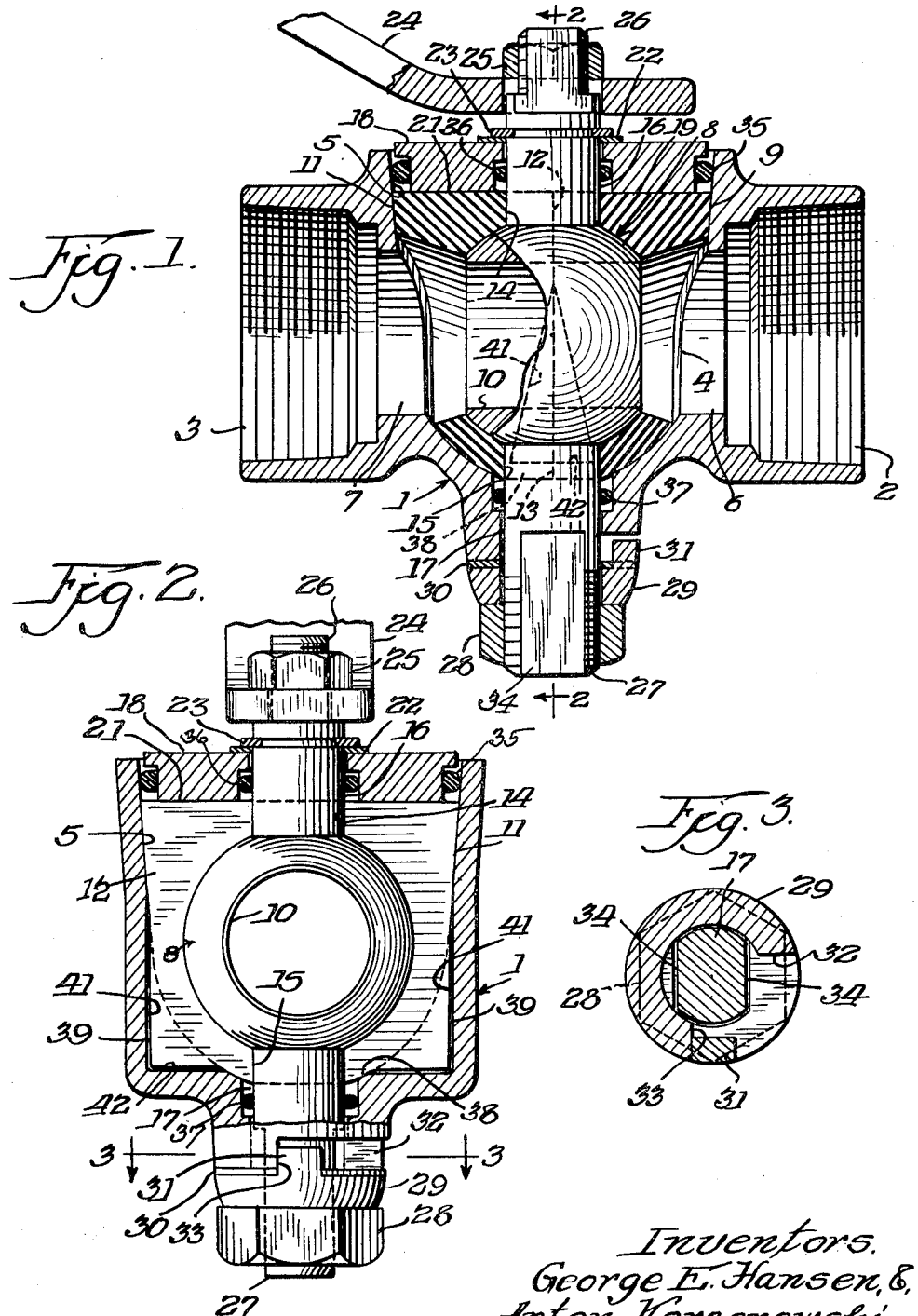

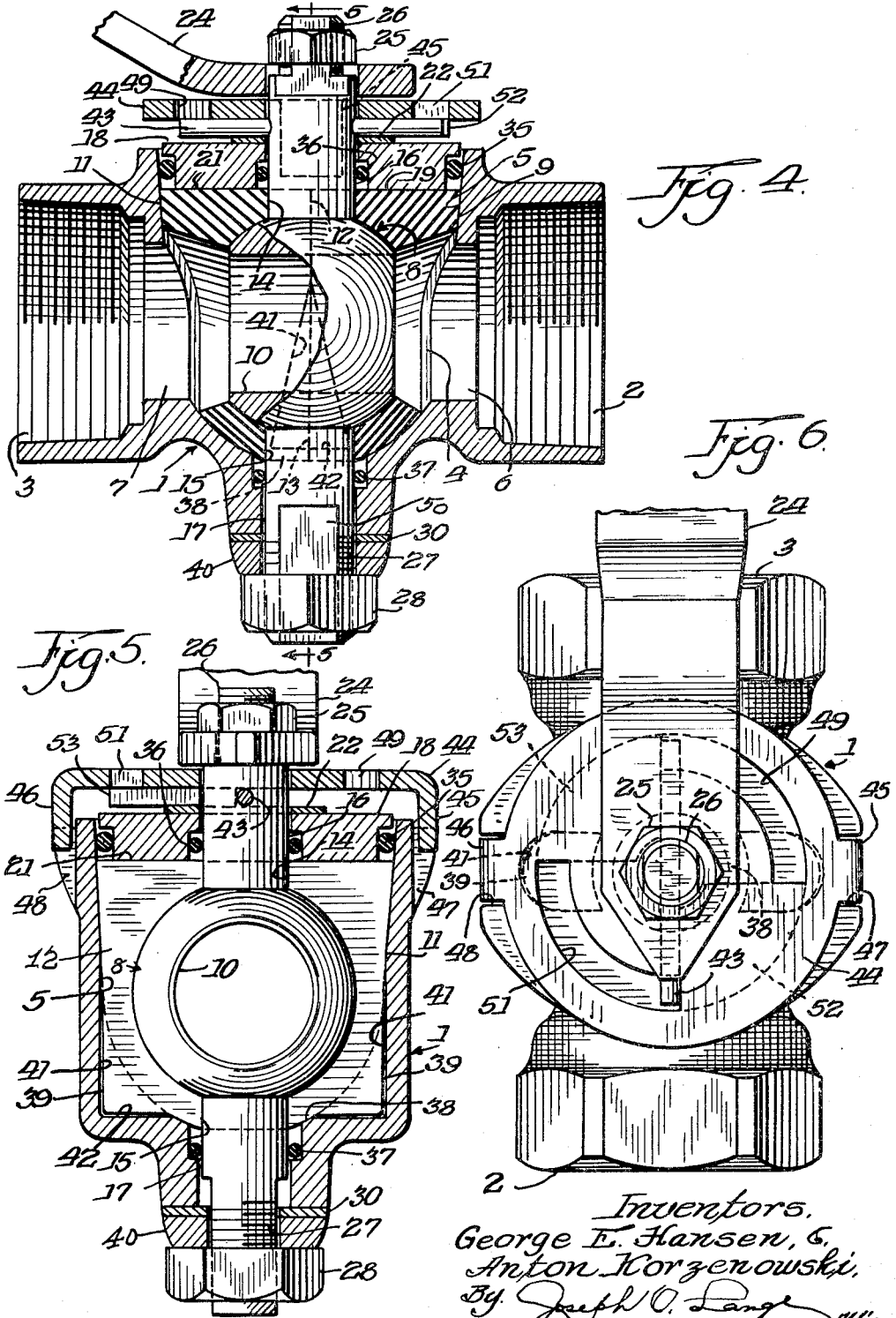

3,171,431
DIVIDED BALL VALVE SEAT AND TRUNNION
George E. Hansen, Elmwood Park, and Anton Korzenow-
ski, Brookfield, Ill., assignors to Crane Co., Chicago,
Ill., a corporation of Illinois
Filed June 26, 1963, Ser. No. 290,737
10 Claims. (Cl. 137—454.6)

This invention relates generally to an improved ball valve construction, and, more particularly, it is concerned with a novel divided ball valve seat and trunnion in combination with a stop arrangement for the spheroidal closure member employed.

In brief, this invention relates to improvements in the ball value construction previously covered in the co-pending patent applications identified as Serial No. 77,901, filed December 23, 1960, now Patent Number 3,100,501, and Serial No. 181,928, filed March 23, 1962.

At the outset, in order to have a better understanding of the merits of this contribution, it should be realized that in the type of ball valve constructions previously referred to by said pending applications there are limitations with respect to the design which are largely dictated by the size of the valves involved. In other words, on larger size ball valves, say, of the order of two-inch and larger, the prior constructions are not entirely acceptable, having in mind particularly that it is desirable to avoid the increased cost of molding the ball and the rubber and eliminating the problem caused by reducing the number of pieces in a mold. In the prior constructions, the spheroidal ported closure member has been encased in a valve seat composed of such synthetic compositions as for example Buna-N. Thus in producing the larger sizes of valves, new problems have been confronted.

Accordingly, it is one of the more important objects of this invention to provide for a ball valve construction in which the cost of production is substantially reduced, while at the same time providing for a compact assembly.

Another important object is to provide for a valve seat for a ball valve employing a two-piece composition seat construction, with the resultant assembly encapsulating the spheroidal ported closure member and portions of the valve stem and trunnion to provide a fluid tight construction.

Another important object is to provide for a two-piece valve seat construction in which each of the seat halves is identical, whereby to permit employing a single mold cavity while providing, however, when such identical seat halves are assembled, a composition seat for a completely encased ball closure member is accomplished.

A further object is to provide for a two-piece seat construction suitable for use on ball valves and particularly in the larger sizes in which the cost of molding the composition is substantially reduced due to the elimination of handling the ball and stem in a single mold as heretofore practiced.

Another object is to provide for a ball valve seat construction in which the molding thereof permits an increase in the number of pieces in the mold thereby resulting in a molded part with less shrinkage and closer mold tolerances, inasmuch as the seat is molded in two parts rather than one.

Another object is to provide for a ball seat construction in which the mold product manufacturer is not necessarily required to be geared to the production of the integral ball and stem for the molded assembly as heretofore. Previously, the integral stem and the closure or ball member were molded within the seat.

Another object is to provide for a two-piece seat construction in which the ball and the stem or either one (if the latter is constructed separately) can be made of various materials and thus selectively assembled.

A further object is to provide for a two-piece seat construction in which the resultant pieces can be suitably lubricated by such lubricants as can be easily applied to each seat half by means of spraying, dipping, or brushing as the requirements of the service may dictate.

Another object is to provide for a two-piece seat construction for a ball valve in which in order to meet service requirements, the molded parts can be made conveniently in various compounds. In the latter connection, certain coating heretofore considered on the stem and the ball because of adherence of these parts to the molded parts is eliminated.

Another object is to provide for a two-piece ball seat construction in which, since it is unnecessary to ship the ball and stem to the molder, the danger of damage arising in shipment or during storage awaiting the molding process is eliminated.

Another object is to provide for a two-piece seat construction in which the seat rings comprising the valve seat can be easily replaced as individual parts without the necessity for replacing the valve closure member and stem.

Another object is to provide for a two-piece seat construction in which balanced fluid pressure can be provided between the inside of the ball closure member port opening and the molded seat. This eliminates the extrusion of the synthetic molded material employed for the valve seats when exposed to the higher fluid pressures in the field.

A further object is to provide that the ball and stem whether made integrally or joined together as inserted within the respective seats permits of a compact assembly being provided that can be easily removed or installed within a valve body as a one-piece unit.

Another object is to provide in combination therewith for a trunnion mounting of the valve stem and ball closure member in the top and bottom of the casing with the ball acting as a carrier to hold the respective molded seats as an assembly to allow for the adjustment and compression of the molded seats to the machined contour of the ball and cavity within the valve body.

Another object is to provide for a two-part seat construction in which an adjusting nut is employed preferably at the bottom of the stem trunnion and thereby allowing for adjustment in compressing the valve seats as desired to obtain fluid tightness and the desired controlled torque or turning effort employed in the operating lever or other actuating means.

A further object is to provide stop mechanisms so flexibly designed as to be capable of being installed either at the top or bottom of the casing and in one form of the construction permitting the stop pin suitably mounted in the valve stem to serve as an abutment. This construction allows for the bonnet employed in combination with fluid sealing means such as O-rings to compress the composition seat rings and thereby provide fluid tightness when the retaining nut is adjusted as hereinafter described.

A further object is to provide in combination with the construction referred to for a grooved pin in which the latter member also serves as an indicator for visual observation to show the position of the ball closure port in such respective positions as open, throttled, or closed.

A further important object lies in the construction of a two-seat assembly in which the more costly and cumbersome bonnet bolts normally used are eliminated and in which the taper provided by the recess within the casing assures of a fluid tight joint being maintained between the recess of the body and the outside of the multi-part seat assembly.

A further advantage lies in that the ball and stem by means of outside adjustment hereinafter described compensates for undue wear in the respective valve seats.

Other objects and advantages will become more readily apparent upon proceeding with the following description read in light of the accompanying drawings, in which:

FIG. 1 is a sectional assembly view of a preferred embodiment of our invention;

FIG. 2 is a fragmentary sectional assembly view taken on the line 2—2 of FIG. 1;

FIG. 3 is a fragmentary sectional view taken on the line 3—3 of FIG. 2;

FIG. 4 is a sectional assembly view of a modified form of the construction embodying our invention;

FIG. 5 is a transverse sectional view taken on the line 5—5 of FIG. 4; and

FIG. 6 is an exterior plan view of the assembly shown in FIG. 4.

Similar reference numerals refer to similar parts throughout the several views.

Referring now to FIG. 1, a conventional valve casing or body generally designated 1 is illustrated having the usual end connections 2 and 3 for attachment to a pipe line (not shown). The said valve body or casing is provided with a central valve chamber 4 defined by the tapered annular walls 5 as shown more clearly in FIG. 2, ported as at 6 and 7 and communicating with the respective port means of attachment 2 and 3 respectively at the upper portion of the casing tapered wall surface 5. A ported ball closure member generally designated 8 ported at 10 is received within the valve chamber 4 encapsulated on opposite sides of the said chamber by means of a pair of molded tapered seat members 9 and 11, the said seat members abuttingly joining as indicated by the dotted lines at 12 and 13 in upper and lower planes as indicated. The said seat halves are relieved as at 14 and 15, so that upon assembly the aperture 14 will encircle snugly the integral valve stem 16 and the lower aperture 15 encircles snugly the integral trunnion 17 all as shown.

It will be appreciated that while reference is made to the stem 16 and the trunnion 17 as being integral with the ported ball closure member 8, these members may be made initially in separate pieces and of differing materials and separately attached to the closure member depending upon the nature of the service condition encountered.

The assembly of the multiple seats 9 and 11 around the ball closure member 8 is enclosed at the upper portion of the chamber 4 by means of a bonnet or cover 18, the latter member being mounted upon the stem 16 so as to bear against the respective semi-circular surfaces 19 and 21 of the respective seats 9 and 11.

On the outer surface of the bonnet 18, a washer 22 is mounted to receive the thrust of a split ring member 23 fixedly received in a groove portion on the stem 16.

At its upper end portion in non-rotatable relation thereto, an operating handle 24 is retained by means of the nut 25 engaging the threads 26 of the valve stem 16. At the lower limits of the trunnion 17, the latter member is threaded as at 27 to receive the nut 28, the latter member bearing against the rotation limiting member 29 which is provided with the stop 31, the closure member 8 thereby being rotatable between the transverse surfaces 32 and 33 more clearly shown in FIGS. 2 and 3.

It will be understood that the bonnet 18 is flexibly mounted relative to the casing and said seat members, being only limited in such flexibility by the split ring 23 and the adjustment on the trunnion 17 effected by the nut 28.

The rotation limiting member 29 is provided with the stop lug 31 movable between the transverse surfaces 32 and 33 of the casing 1 as more clearly shown in FIGS. 2 and 3. The rotation limiting member 29 is mounted over the trunnion 17 as indicated in a non-rotatable manner to engage the flat surface portion 34 of the said trunnion 17. Thus the rotation of the ball 8 on its central axis is limited so as to rotate arcuately between the casing surfaces 32 and 33 by predetermined engagement therewith of the stop lug 31 as shown more clearly in FIG. 3. Between the rotation bearing member, a spacer washer 30 is interposed as indicated to receive the thrust of the closure member as hereinafter explained.

For the purpose of providing suitable fluid sealing functions between the bonnet 18 and the casing 1 and between the stem 16 and the said bonnet as well as between the casing and the trunnion, suitable O-rings are employed annularly as indicated at 35, 36, and 37 respectively.

In the manner of providing for the desirable fluid sealing function between the plurality of seat members employed at 9 and 11 and the casing 1 and also between each seat member and the ball closure member 8, it will be apparent that it is only necessary to adjust the position of the nut 28 thereby engaging the threaded portion of the trunnion 17 to draw the ball closure member 8 longitudinally against the lower curved portion of the respective seat members, causing the latter to engage the body annular concave surface 38 as shown more clearly in FIG. 2.

In order to hold the respective seat members 9 and 11 against relative rotation during the operation of the valve from open to closed position and vice versa, each of the said seat members is provided with a side projecting transverse portion 39 which engages a similarly recessed portion 41 disposed on each side of the valve body chamber as indicated more clearly in FIG. 1. It will be appreciated that in tightening the nut 28 upon the threaded trunnion shank 27, the respective projections on each of the seat members as designated at 39 at their lower end portion will abut against the inner annular surface 42 of the casing in addition to the contact made by the respective seat members at the casing annular surface 38.

In considering the merits of the above described construction, it will be understood that the respective seat halves 9 and 11 can be independently molded and subsequently applied to the ball closure member to complete the assembly shown in a fluid sealing contact with the valve body.

The respective finishes of the said seat members may be varied to suit the desired service conditions and this also applies to the ball closure member in addition to the respective stem and trunnion. Thus, a high degree of versatility is provided in a ball valve construction heretofore considered impractical. It will, of course, be appreciated that the abutting contacts between the respective seat members at 12 and 13 on each side of the vertical axis of the valve as shown more clearly in FIG. 1 will be sufficient to enable the desired fluid sealing function around their respective apertures at 14 and 15 above and below. The construction also permits balancing of fluid pressures between respective seat halves at surfaces 12 and 13 whereby to avoid objectionable binding and distortion and undue wear encountered in the course of service. The advantage lies in eliminating extrusion of the seat material under high fluid pressures.

Referring now to a further modified construction, attention is directed to FIGS. 4 to 6 inclusive. In considering the modification, it will be appreciated that the specific manner in which the enclosure of the assembly of the stem and casing cooperates with the seat members 9 and 11 may vary particularly with respect to the manner in which the positioning of the visual indicating means and rotation inhibiting members are mounted. Specifically directing attention to FIG. 4, the valve stem 16 at a portion just beyond the valve bonnet 18 and preferably allowing for the support thereof, a transversely extending pin 43 extends through the said stem as shown in each of the figures. The pin is made of such length as to cooperate with the indicating plate 44 arcuately slotted and having oppositely disposed downwardly turned integral lugs 45 and 46 engaging suitable slotted oppositely disposed grooves 47 and 48 to hold the indicator plate 44 against rotation as shown in FIGS. 5 and 6. It will be noted that the plate 44 is provided, as shown more clearly in FIG. 6, with the arcuately extending through slots 49 and 51. For cooperation with the arcuately rotating ball closure member 8 and for engagement by the pin 43, the underside of the indicator plate 44 is provided with suitable downwardly extending lugs 52 and 53 of generally triangular configuration as shown more clearly in the plan view of FIG. 6. It will be noted as shown more clearly in FIGS. 4 and 5 that the respective flat plate-like lugs 52 and 53 are of segmental form at their lower surface portions and bear against the washer 22 thereby to support the indicator plate 44 upon the outer surface of the bonnet 18. In this construction, it will now be clear that the ease of observation of the respective rotative positions of the ball closure member is easily ascertained and simplifies the lower construction of the attachment means required for the valve seats and closure member within the casing by simply employing a threaded shank on the depending trunnion 17 together with the retaining nut 28 and the washer 40, as shown.

As shown more clearly in FIG. 4, the trunnion 17 is flattened on a side as indicated at 50 for non-rotatable engagement by said washer 40 and the retaining nut 28.

In all other respects, the construction is similar to that described in connection with FIGS. 1 to 3 inclusive, and therefore, it is unnecessary to repeat the description of the instant modification.

Thus a new visual indicating means and stop or rotation inhibiting arrangement are conveniently provided.

While a plurality of embodiments have been shown and described here, it will of course be appreciated that this is for purpose of illustration only and that the scope of the invention should be read in light of the accompanying claims as follows.

We claim:
1. A ball valve comprising a casing with an inlet and an outlet and a substantially frusto-conical valve chamber therebetween having an inner end apertured surface defined by a curved surface around the apertured portion of substantially spheroidal configuration and an opposite open portion;
   a two-piece mated seat member forming when assembled hollow flexible ported substantially frusto-conical sections with complementary inner rounded apertured portions of substantially the same configuration as the valve chamber inner apertured portion and being engaged by said casing to inhibit rotation of said seat members relative to said casing, the latter seat members substantially covering the wall surfaces defining the said valve chamber and having abutting flat surfaces extending in substantially a vertical plane at the center of the valve casing and being contiguous with the rotation inhibiting means of said seat members;
   a spheroidal ported closure member fitted within said seat members upon assembly of the latter;
   a bonnet flexibly mounted and limitedly movable axially for closing said opposite open portion of the valve chamber, said bonnet being supported by said seat member and said spheroidal ported valve closure member upon assembly of the latter members within said valve chamber and having an outer peripheral portion thereof in spaced-apart relation to said opposite open portion of the valve chamber;
   the said valve closure member being limitedly movable axially with said bonnet and having a stem portion projecting through the said bonnet and having a trunnion portion projecting through the rounded apertured portion of said valve chamber of said casing to effect said limited axial movement of said closure and bonnet members.

2. The subject matter of claim 1, the combination including annular fluid sealing means for said bonnet.

3. The subject matter of claim 1, the combination including annular fluid sealing means for said stem and trunnion.

4. The subject matter of claim 2, the said bonnet fluid sealing means engaging said stem portion and said casing in substantially the same horizontal plane.

5. The subject matter of claim 1, the combination including annular fluid sealing means for said stem, trunnion portion and bonnet, the fluid sealing means for the latter member extending between said spaced apart peripheral portion of said bonnet and the said opposite end portion of the casing valve chamber.

6. A ball valve construction comprising a casing with an inlet and an outlet and a substantially frusto-conical valve chamber therebetween having an inner end apertured surface defined by a curved surface around the apertured portion of substantially spheroidal configuration and an opposite open end portion;
   a mated two-piece hollow seat member forming when mated hollow flexible ported frusto-conical sections with complementary inner rounded apertured portions of substantially the same configuration as the valve chamber inner apertured portion and having means thereon cooperating with said casing to inhibit rotation of said seat members, the latter members substantially covering the wall surfaces defining the said valve chamber and having flat abutting surfaces thereon extending in a vertical plane midway between said casing inlet and outlet transverse to the valve horizontal axis of said casing;
   a spheroidal ported closure member upon assembly in said casing chamber being snugly received within the hollow portions of said seat members;
   a cover for closing said opposite open end portion of the valve chamber, said cover overlying said spheroidal ported valve closure member and said seat members;
   the said valve closure member having a stem portion projecting through the said cover and having a depending trunnion portion projecting through the rounded apertured portion of the casing; and
   means cooperating with said trunnion and casing for drawing said closure member against said seat members.

7. The subject matter of claim 5, the upper chamber portion being annularly inclined to engage said cover fluid sealing means.

8. The subject matter of claim 5, the said casing having stop means on a lower portion cooperating with said trunnion to effect said rotation limiting function.

9. The subject matter of claim 5, the said casing having stop means on an upper portion thereof cooperating with said stem to effect said rotation limiting function, the said stem having means thereon for engagement with said casing stop means.

10. The subject matter of claim 9, the said casing stop means including a slotted plate non-rotatably mounted on said casing having spaced apart stops on an underportion thereof for predetermined engagement by said stem means and for visually indicating the rotative position of said closure member.

References Cited in the file of this patent

UNITED STATES PATENTS 2,911,187    Owsley _____ Nov. 3, 1959
3,100,501    Hansen et al. _____ Aug. 13, 1963

FOREIGN PATENTS 275,427    Great Britain _____ Aug. 11, 1927